(12) United States Patent
Yan

(10) Patent No.: US 10,791,090 B2
(45) Date of Patent: Sep. 29, 2020

(54) WIRELESS MESH ACCESS POINT WITH USER-SPACE TUNNELING

(71) Applicant: Google LLC, Mountain View, CA (US)

(72) Inventor: Kan Yan, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/215,382

(22) Filed: Dec. 10, 2018

(65) Prior Publication Data

US 2019/0190887 A1 Jun. 20, 2019

Related U.S. Application Data

(60) Provisional application No. 62/598,761, filed on Dec. 14, 2017.

(51) Int. Cl.

| | |
|---|---|
| *H04L 29/12* | (2006.01) |
| *H04W 84/18* | (2009.01) |
| *H04L 12/46* | (2006.01) |
| *H04W 84/12* | (2009.01) |
| *H04W 88/08* | (2009.01) |

(52) U.S. Cl.
CPC ...... *H04L 61/2592* (2013.01); *H04L 12/4633* (2013.01); *H04L 61/2007* (2013.01); *H04W 84/18* (2013.01); *H04L 61/6022* (2013.01); *H04W 84/12* (2013.01); *H04W 88/08* (2013.01)

(58) Field of Classification Search
CPC . H04L 12/4633; H04L 12/4641; H04L 45/50; H04L 61/2592; H04L 61/2007; H04L 61/6022; H04W 36/18; H04W 40/36; H04W 80/04; H04W 84/12; H04W 84/18; H04W 88/08
See application file for complete search history.

(56) References Cited

U.S. PATENT DOCUMENTS

| | | | |
|---|---|---|---|
| 2009/0034470 A1* | 2/2009 | Nagarajan | H04L 12/1886 370/331 |
| 2010/0260146 A1* | 10/2010 | Lu | H04L 12/4633 370/331 |
| 2016/0308763 A1* | 10/2016 | Sindhu | H04L 12/4633 |

OTHER PUBLICATIONS

"International Search Report and Written Opinion", PCT Application No. PCT/US2018/065228, dated Feb. 20, 2019, 13 pages.

* cited by examiner

*Primary Examiner* — Jung Liu
(74) *Attorney, Agent, or Firm* — Colby Nipper PLLC

(57) ABSTRACT

This document describes methods, devices, systems, and means for a wireless mesh access point with user-space tunneling. A first wireless mesh network access point (WMAP) determines that a frame from a first device is destined for a second device associated with a second WMAP. The first WMAP encapsulates the frame to produce an encapsulated frame that includes an Internet Protocol (IP) header and a payload, the Internet Protocol (IP) header including an IP destination address of the second WMAP and an IP source address of the first WMAP, and the payload including a header and payload data from the frame. The first WMAP sends the encapsulated frame to the second WMAP using a station mode interface of the first WMAP, which causes the second WMAP to forward the frame to the second device.

20 Claims, 7 Drawing Sheets

WIRELESS MESH ACCESS POINT WITH USER-SPACE TUNNELING

RELATED APPLICATION

This application claims priority under 35 U.S.C. § 119(e) to U.S. Provisional Patent Application 62/598,761, filed on Dec. 14, 2017, which is incorporated herein by reference in its entirety.

BACKGROUND

Wireless mesh networks, such as those based on the IEEE 802.11s standard, serve as self-forming and self-healing mesh networks that improve the coverage range for wireless devices in homes and other environments. To implement a wireless mesh network, wireless mesh nodes, such as access points, must be able to forward frames to other wireless mesh nodes. Several existing methods to forward frames (also referred to as packets) between two wireless mesh nodes use a six-address frame encoding as defined in the IEEE 802.11s standard, or use a four-address mode as specified in the IEEE 802.11 standard, such as those used in a Wireless Distribution System (WDS). However, requirements for implementing the IEEE 802.11s standard on chipsets, drivers, firmware, and the wireless stack can be difficult to meet. Most mobile electronic devices and consumer electronic devices use "dongle" type wireless chip sets with most of the wireless functionality implemented in the firmware of an embedded central processing unit (CPU) of the wireless chipset. The IEEE 802.11s standard is not typically supported by most of these chip types.

The Wireless Distribution System (WDS) typically lacks key support for many features like Wi-Fi Protected Access (WPA). The IEEE 802.11 standard does not define how to construct WDS implementations or how WDS stations interact to arrange for exchanging frames which can result in poor interoperability among different WDS products. The firmware and drivers required to support 802.11 or WDS are typically vendor specific or even chipset specific. Changing wireless chipset vendors by device manufacturers can mean that the majority of the mesh implementation needs to be designed and implemented from scratch for each different wireless chip set vendor.

Another technique developed to solve this problem classifies frames into flows and records the original source address for each flow and does address translation for reply frames at layer two of the network stack. However, such a technique can be problematic especially for layer two protocol frames because the source address has been changed. Other methods, such as Better Approach To Mobile Adhoc Networking (BATMAN), include defining a new type of layer two frame by adding another layer of encapsulation to record the origin Media Access Control (MAC) address.

SUMMARY

This summary is provided to introduce simplified concepts of a wireless mesh access point with user-space tunneling. The simplified concepts are further described below in the Detailed Description. This summary is not intended to identify essential features of the claimed subject matter, nor is it intended for use in determining the scope of the claimed subject matter.

In an aspect, a method for forwarding a frame by a first wireless mesh network access point (WMAP) is described in which the first WMAP determines that the frame, from a first device, is destined for a second device associated with a second WMAP. The first WMAP encapsulates, using application layer control logic, the frame to produce a first encapsulated frame that includes an Internet Protocol (IP) header and a payload, the Internet Protocol (IP) header including an IP destination address of the second WMAP and an IP source address of the first WMAP, and the payload including a header and payload data from the frame. The first WMAP sends the first encapsulated frame to the second WMAP using a station mode interface of the first WMAP, the sending being effective to cause the second WMAP to forward the frame to the second device.

In another aspect, a source wireless mesh access point (WMAP) that includes an access point (AP) mode interface and a station (STA) mode interface is described. The source WMAP is configured to determine that a frame, received via the AP mode interface, from a source device is destined for a destination device associated with a destination WMAP. The source WMAP is configured to encapsulate, using application layer control logic, the frame to produce an encapsulated frame that includes an Internet Protocol (IP) header and a payload, the Internet Protocol (IP) header including an IP destination address of the destination WMAP and an IP source address of the source WMAP, and the payload including a header and payload data from the frame. The source WMAP is configured to send the encapsulated frame to the destination WMAP, using the station mode interface, which is effective to cause the destination WMAP to forward the frame to the destination device.

In a further aspect, a destination wireless mesh access point (WMAP) including an access point (AP) mode interface, application layer control logic, and a virtual tunnel interface is described. The access point mode interface is configured to receive an encapsulated frame from a source WMAP, remove a layer two and a layer three header from the encapsulated frame to produce an un-encapsulated frame, and provide the un-encapsulated frame to the application layer control logic. The application layer control logic is configured to send the un-encapsulated frame to the virtual tunnel interface which is configured to forward the un-encapsulated frame to the AP mode interface. The access point mode interface is configured to convert the un-encapsulated frame to a wireless frame in wireless frame format and to send the wireless frame to a destination device.

BRIEF DESCRIPTION OF THE DRAWINGS

Aspects of a wireless mesh access point with user-space tunneling are described with reference to the following drawings. The same numbers are used throughout the drawings to reference like features and components.

DETAILED DESCRIPTION

Figure 1A:
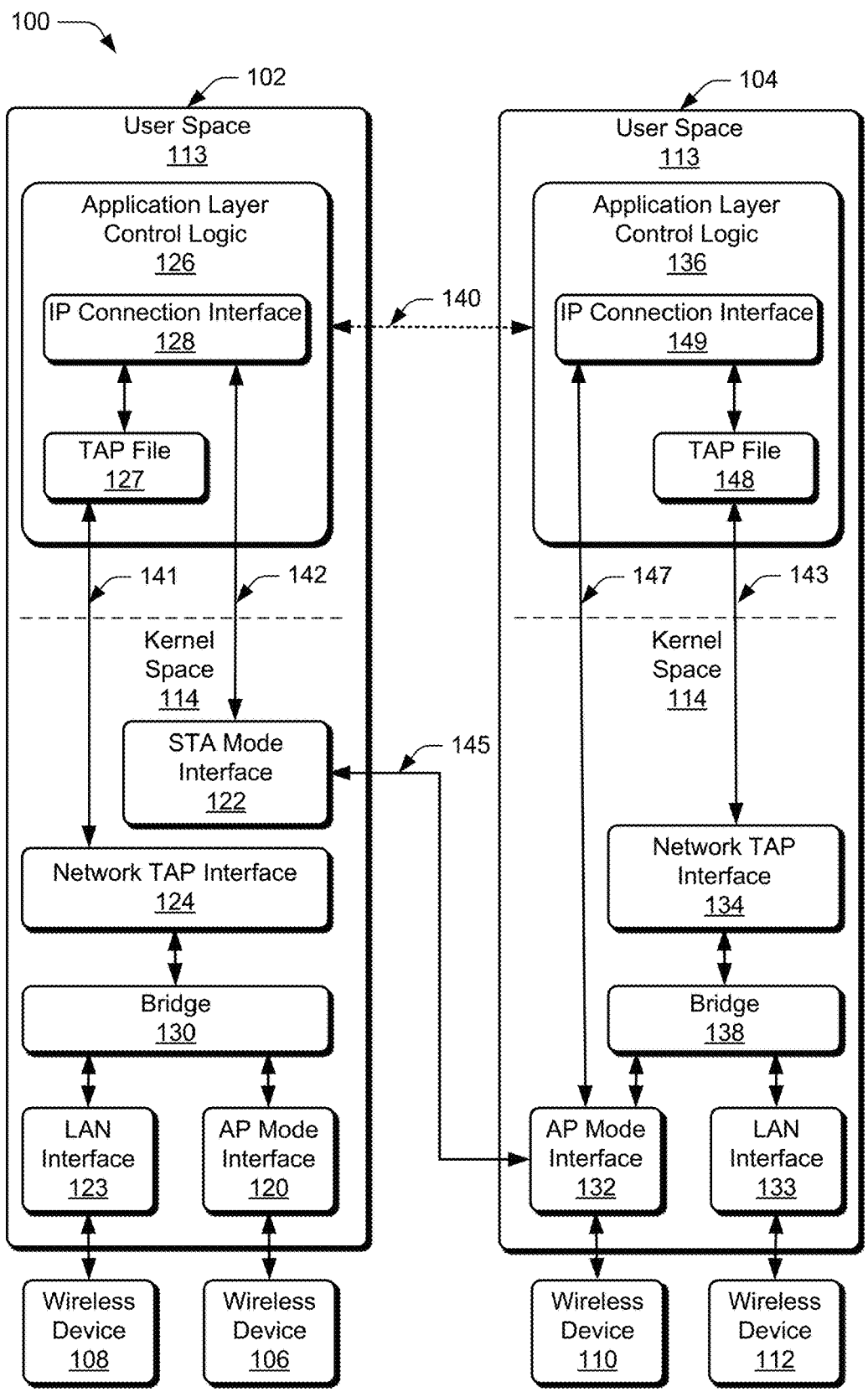
FIG. 1a illustrates an example wireless mesh network system in which various aspects of a wireless mesh access point with user-space tunneling can be implemented.

This document describes methods, devices, systems, and means for a wireless mesh access point with user-space tunneling. A first wireless mesh network access point (WMAP) determines that a frame from a first device is destined for a second device associated with a second WMAP. The first WMAP encapsulates the frame to produce an encapsulated frame that includes an Internet Protocol (IP) header and a payload, the Internet Protocol (IP) header including an IP destination address of the second WMAP and an IP source address of the first WMAP, and the payload including a header and payload data from the frame. The first WMAP sends the encapsulated frame to the second WMAP using a station mode interface of the first WMAP, which causes the second WMAP to forward the frame to the second device.

Most Wi-Fi chipsets, including the low-cost dongle type, use Wi-Fi chipsets with Secure Digital Input Output (SDIO) or Universal Serial Bus (USB) interfaces and support concurrent access point (AP) mode and station (STA) mode on the same channel. A station mode interface however is specified by the IEEE 802.11 standard as not being allowed to forward frames originated from other wired or wireless devices to an access point. A wireless device can only send frames originated by itself to the access point with which it is associated. According to the IEEE 802.11 standard, a frame sent from a wireless device to an access point should be encapsulated using a three-address format. The three addresses are a receiver address (RA), which is the destination AP's media access control (MAC) address, or Basic Service Set Identifier (BSSID); a source address (SA), which is the wireless device's MAC address; and a destination address (DA) which is the destination client device's MAC address.

Forwarding a frame from other stations by a wireless device to its access point, is not allowed by the IEEE 802.11 standard. Following the IEEE 802.11 standard, the frame will be encapsulated using the wireless device's own MAC address as the SA, instead of the original wireless device's MAC address. As such, the original frame source address (the original wireless device sender's MAC address) is lost.

In aspects, an application layer wireless mesh networking solution employs application layer control logic, such as one or more processors executing a user-space daemon, and a kernel-space layer two virtual tunnel interface, such as a tap (TAP) virtual network interface, to form a tunnel to facilitate inter-Wireless Mesh Access Point (inter-WMAP) frame forwarding using the backhaul station (STA) mode interface of a source Wireless Mesh Access Point (WMAP). In one example, instead of forwarding frames directly using station mode interfaces, which is not supported by the IEEE 802.11 standard, a tunnel is used. The tunnel includes the TAP virtual network interface and a user-space Internet Protocol (IP) socket connection between the two WMAPs. The TAP virtual network interface operates as a layer two virtual network interface, behaving like a pipe. One end of the pipe is a TAP virtual network interface in a kernel layer and the other end of the pipe, which is in the user-space, can be read and written as a file.

Continuing with the example, application layer control logic in a source WMAP reads a frame from a TAP file handle in the user space and sends the frame to the station mode interface for transmission. In a destination WMAP, the application layer control logic writes a frame received from the IP socket to a TAP file handle in the user space that causes the frame to appear in a TAP virtual network interface, in the kernel space, as a received frame, which is forwarded to a corresponding bridge so that the frame can be delivered to the destination client device. Frames sent to the TAP network interface for transmission will appear at the other end of the pipe when the file handle is being read. Because the TAP virtual interface is bridged together with an AP mode interface and other interfaces like a wired Ethernet interface (LAN interface), frames coming from the AP mode interface or the Ethernet interface that are forwarded to the TAP virtual network interface by the bridge are tunneled to the application layer control logic and in particular, to the TAP file. The application layer control logic is used to send a frame over the IP socket connection through the station mode interface.

Unlike prior approaches such as a kernel tunneling approach, an application layer control logic mechanism, such as a user-space daemon, interfaces with a network TAP interface to provide user-space tunneling that employs the station mode interface of a source WMAP to allow inter-WMAP communication. Layer three frames are produced using the application layer control logic, and those frames are encapsulated with a layer two header to produce layer two frames to be forwarded to the destination WMAP. Layer three frames are encapsulated using a layer two header (e.g., the MAC addresses of the destination AP mode interface and the source STA mode interface) to enable the application layer control logic to use the station mode interface as a backhaul to forward frames between different WMAPs. Sending frames or packets over the tunnel adds little overhead, and airtime usage is efficient, while enabling the use of any IEEE 802.11-compliant chipset in a WMAP.

In another aspect, WMAPs that support IEEE 802.11s mesh Wi-Fi can increase the coverage area and reliability of a Wi-Fi mesh network by also supporting wireless mesh access with user-space tunneling. The WMAPs can extend mesh networking to Wi-Fi devices without IEEE 802.11s chipsets using wireless mesh access with user-space tunneling to increase the number of mesh network devices and add additional routing paths to increase mesh network reliability.

Example Environment

FIG. 1 illustrates an example of a wireless mesh network 100 in which various aspects of a wireless mesh access point with user-space tunneling can be implemented. The mesh network 100 includes a source wireless mesh access point (WMAP) 102 and a destination WMAP 104. It will be recognized that communication can be two-way such that both WMAP's can serve as a source or a destination. The source WMAP 102 is in communication with one or more wired or wireless devices 106 and 108. For purposes of illustration only, the devices 106 and 108 will be referred to as wireless devices, although as illustrated, the devices 106 and 108 may connect to the WMAP 102 using a wired or wireless connection. Similarly, the destination WMAP 104 is in communication with one or more destination wireless devices 110 and 112. In this example, each WMAP 102 and 104 includes system memory or other suitable memory divided into a kernel space 114 memory and a user-space 113 memory (the division being illustrated by the dashed lines in FIG. 1), such that one or more processors included in the WMAPs execute code including kernel space (or kernel layer) code and user-space code. As used herein, the user-space code will also be referred to as application layer code. In one example, the kernel layer is part of an operating system such as a Linux operating system, an Android operating system, or any other suitable operating system.

The source WMAP 102 includes an access point (AP) mode interface 120 and one or more station (STA) mode interfaces 122. In one example, the WMAP 102 also includes a local area network (LAN) interface 123 that processes frames from wireless device 108, which are forwarded to the WMAP 104 by the STA mode interface 122 in the same way as wireless frames. The access point mode interface 120 implements infrastructure mode as defined, for example, in the IEEE 802.11 standards, to form a Basic Service Set (BSS) to provide connections for wireless and wired clients such as wireless devices 106 and/or 108. Conventionally, the station mode interface 122 is used to communicate its own packets to another WMAP but not to forward frames from other devices. The station mode interface 122 connects to neighboring WMAPs to provide backhaul connections for the BSS. The AP mode and STA mode interfaces can be individual physical interfaces or virtual interfaces on top of a single physical interface, or any other suitable structure.

As noted above, according to the IEEE 802.11 standard, the station mode interface 122 cannot forward certain frames, however, in aspects, an application layer tunnel (virtual tunnel) 140 diagrammatically depicted from the perspective of user space is used. TAP virtual network communication, via various layers of a network stack, between kernel space and user space is illustrated at 141 and 142. The application layer tunnel 140 is formed using a virtual tunnel interface, such as a network TAP interface 124. The tunnel also includes the use of application layer control logic 126 in the user space that includes an IP socket connection between the WMAP 102 and WMAP 104, as illustrated by IP connection interface 128.

In this example, the application layer control logic 126, such as a user-space daemon, employs a read/write network TAP file 127. The application layer control logic 126 uses the IP connection interface 128 to form inter-WMAP communication using the station mode interface 122. The network TAP interface 124 is a layer two virtual network interface and behaves like a pipe. As illustrated at 141, one end of the pipe is a network TAP interface 124 in kernel space. The other end of the pipe is in user-space and uses the TAP file 127. Sending a frame to the network TAP interface 124 by the bridge 130 causes the frame to appear at the other end of the pipe in the TAP file 127 as a frame to transmit. Frames sent to the network TAP interface 124 for transmission will appear at the other end of the pipe, and the application layer control logic 126 reads a corresponding file handle to obtain the frame to transmit.

For example, pseudo code of an implementation of the application layer control logic is:
//Send thread: forever { read_from_pipe( ); Send_to_socket( ); }
//Receive thread: forever { read_from_socket( ); Send_to_pipe( ); }

Because the network TAP interface 124 is bridged together through bridge 130 with the access point interface 120, frames coming from the access point interface 120, that are forwarded to the network TAP interface 124 by the bridge 130, will be passed to the TAP file 127 at the application layer. The bridge 130 in this example is a bridge that uses a table to determine which interface the frame should be forwarded to or forward the frames to all ports of the various interfaces in the case where there is no entry in the table. The application layer control logic 126 is used to send a frame or frames over the IP connection interface 128 through the station mode interface 122.

The destination WMAP 104 includes similar interfaces including an access point mode interface 132, a virtual tunnel interface such as a network TAP interface 134, corresponding application layer control logic 136, and a bridge 138. The destination WMAP 104 can also include a LAN interface 133 that communicates with wired devices. The application layer control logic 136 includes a corresponding IP connection interface 149 (e.g., an IP socket interface) and a TAP file 148. Frames received at the AP Mode interface 132 are sent via various layers of the network stack at 147 to the IP connection interface 149, which the application layer control logic 136 in turn writes to the corresponding TAP file 148. The frames are then received, via various layers of the network stack at 143, by the network TAP interface 134 and forwarded to the bridge 138. The bridge 138 forwards the frames to the final wireless device destination via the AP mode interface 132.

Figure 1B:
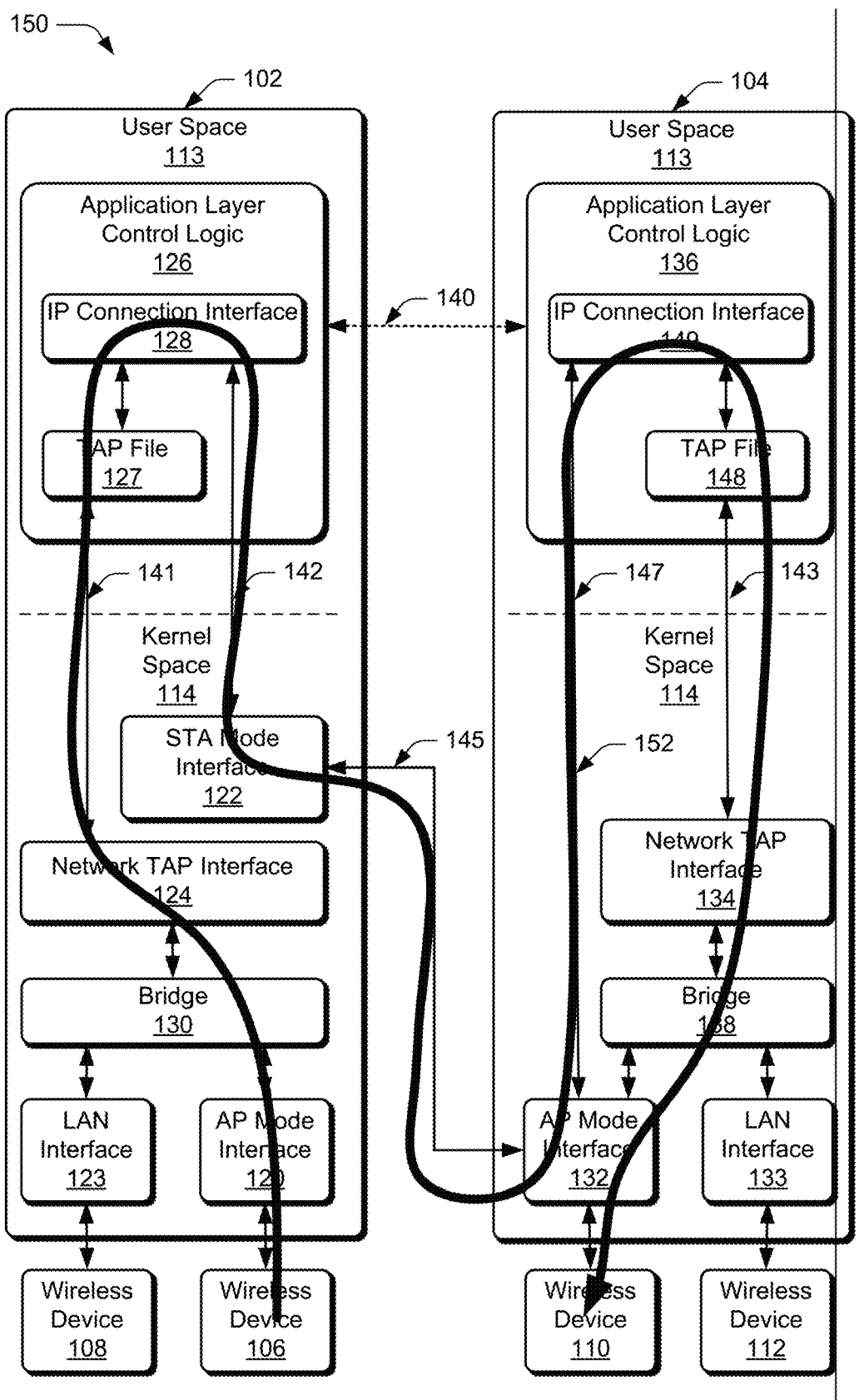
FIG. 1b illustrates a further example wireless mesh network system in which various aspects of a wireless mesh access point with user-space tunneling can be implemented.

Referring back to the station mode interface 122, frames from the IP socket are locally generated frames and are not forwarded frames from another host, so the frames can be sent over the station mode interface 122. The graphic representation of the application layer tunnel 140 is meant to indicate a socket connection between the source WMAP 102 and the destination WMAP 104, respectively. The socket connection can be a User Datagram Protocol (UDP), Transmission Control Protocol (TCP), Transport Layer Security (TLS), or another protocol-based socket. The physical link for the socket is the station mode interface 122 illustrated at 145. FIG. 1b illustrates the flow of a frame, at 152, from the wireless device 106 to the wireless device 110 through the application layer tunnel 140.

Example Frame Encapsulation

Figure 2:
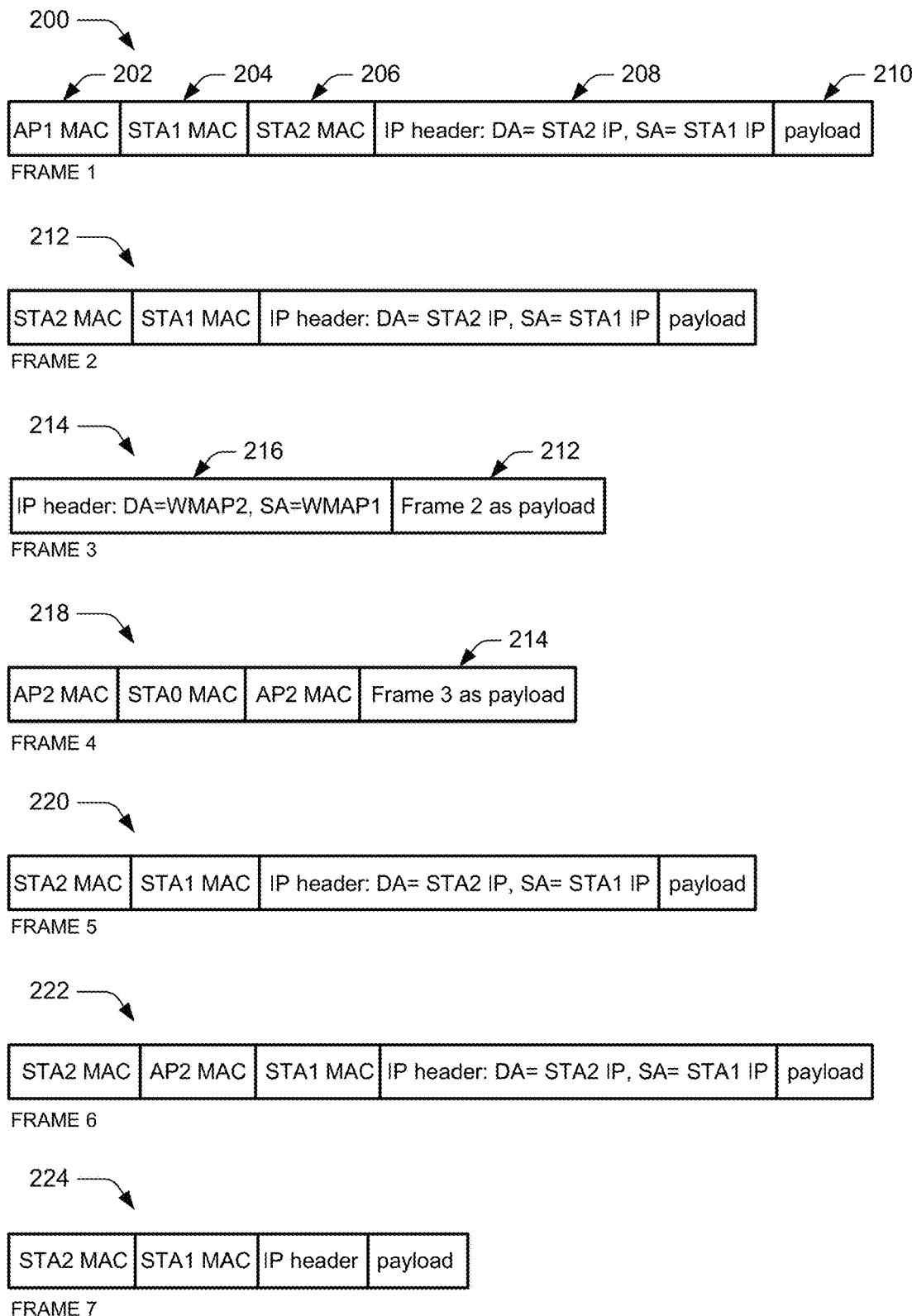
FIG. 2 illustrates frame generation in accordance with aspects of a wireless mesh access point with user-space tunneling.

FIG. 2 illustrates frame generation in accordance with aspects of a wireless mesh access point with user-space tunneling. The frame structures are illustrated for communication of a frame from the wireless device 106 (illustrated as STA1) to another wireless device 110 (illustrated as STA2) using inter-WMAP communication via the station mode interface 122. The communication includes receiving frame 200 that is sent from the wireless device 106 to the AP mode interface 120. The frame 200 includes a layer two header (802.11), with fields including a receiver address (RA) 202, which in this example is the source AP mode interface MAC address (illustrated as "AP1 MAC"), a transmitter address (TA) 204, which is the wireless device MAC address (illustrated as "STA1 MAC"), a destination address (DA) 206, which is the MAC address of the destination wireless device 110 (illustrated as "STA2 MAC"), a layer three header 208 (illustrated as "IP header") which in this case includes a destination address that is the IP address of the destination wireless device IP address (illustrated as "DA=STA2 IP") and a source address that is the IP address of the source wireless device IP address (illustrated as "SA=STA1 IP"), and a payload 210. It will be recognized that other fields may also be included. The AP mode interface 120 receives frame 200 and converts the frame to an 802.3 Ethernet frame encapsulation format from an 802.11 wireless frame encapsulation format resulting in a first encapsulated frame 212. The frame 212 is sent to the bridge 130 which determines that the frame 212 is destined for the wireless device 110 associated with the destination WMAP 104. The bridge 130 forwards the frame 212 to the network TAP interface 124, which in turn provides the frame for the application layer control logic 126, via TAP file 127. The application layer control logic 126 employs the TAP layer two tunnel interface, so the layer two header is kept when the application layer control logic 126 receives the frame.

The application layer control logic 126 sends the frame over the IP connection interface 128 to the destination WMAP 104. To carry out the process, the network stack adds a layer three header to produce frame 214. As such, the application layer control logic 126 causes frame 212 to be encapsulated using the network stack. As a local frame, it can be sent to the WMAP 104 using the station mode interface 122, at 145. As such, frame 214 is an encapsulated frame 212. The layer three header is shown at 216. The application layer control logic 126 sends the encapsulated frame 214 to the WMAP 104 via the IP connection interface 128 and the station mode interface 122. The frame 214 is further encapsulated by the station mode interface 122 that adds a layer two (IEEE 802.11) header to frame 214 to produce a further encapsulated frame 218. The frame 214 is sent to the network stack for transmission (WMAP 102 network stack). The network stack picks the station mode interface 122 as the network interface to deliver the frame 214 and adds the layer two header. The frame 218 includes both a layer two header and also includes a layer three header (IP header). As such, the further encapsulated frame 218 includes a receiver address (illustrated as "AP2 MAC") that is the MAC address of the AP mode interface 132 of the WMAP 104, a transmitter address (illustrated as "STA0 MAC") that is the station mode interface MAC address of the station mode interface 122 of the WMAP 102, and a destination address (illustrated as "AP2 MAC") that is the MAC address of the AP mode interface 132 of the WMAP 104. The encapsulated frame 218 is destined for the WMAP 104 and is transmitted to the WMAP 104.

At the destination WMAP 104, the application layer control logic 136 receives the frame 218 with the layer two and layer three header stripped off resulting in frame 220. Layer two and layer three headers are stripped off by the AP mode interface's wireless stack and networking stack in the WMAP 104. In one example, the network stack removes the layer three header and the AP mode interface's wireless stack (e.g., driver) removes the layer two header.

The application layer control logic 136 sends frame 220 received from the IP connection interface 149, via the TAP file 148, to the network TAP interface 134. The frame 220 is forwarded to the AP mode interface 132 by the bridge 138. The AP mode interface 132 transmits frame 220 to the wireless device 110 by converting it to an 802.11 wireless frame encapsulation from 802.3 Ethernet frame encapsulation. As such, the frame 222 is sent to the wireless device 110. The wireless device 110 receives the frame 222 and converts the frame to an 802.3 frame shown as frame 224.

Sending frames or packets over the application layer tunnel 140 adds little overhead, and airtime usage is efficient. If desired, a "zero-copy" implementation by the processor to copy data to, from, and between the kernel layer and user layer may be employed. However, any suitable mechanism may be employed. In one example, a WMAP can be created as a mesh leaf node by forming a tunnel connection with other WMAPs. It is also possible that a WMAP can have multiple neighboring WMAPs that can provide backhaul services. In this case, a mesh path selection method can be used to determine which WMAP has the most optimal path to deliver the frame with least cost, usually the cost to a root mesh node. The WMAP can then form a tunnel connection to the neighboring WMAP with the least path cost. It will also be recognized that multiple tunnels to nearby access points may also be employed, and a mesh path selection operation can be used to find the best path and avoid undesirable looping. Each tunnel connection, in one example, uses one shared virtual network TAP interface, but multiple IP sockets (IP connection interface) can be used, such as one IP socket for each neighboring WMAP.

Stated another way, for the station mode interface 122, frames sent through the IP connection interface 128 are locally generated frames, not forwarded frames from other hosts, so the frames can be sent over the station mode interface 122. The socket connection between the source and destination WMAPs can be a user datagram protocol (UDP), transmission control protocol (TCP), or transport layer security (TLS) connection. The physical link used by the socket connection to send packets to another WMAP in one example is the station mode interface as a backhaul. The wireless bridge can be implemented by a user-space daemon that shuffles frames between the TAP pipe and the IP socket connection.

Example Hybrid Mesh Network

Figure 3:
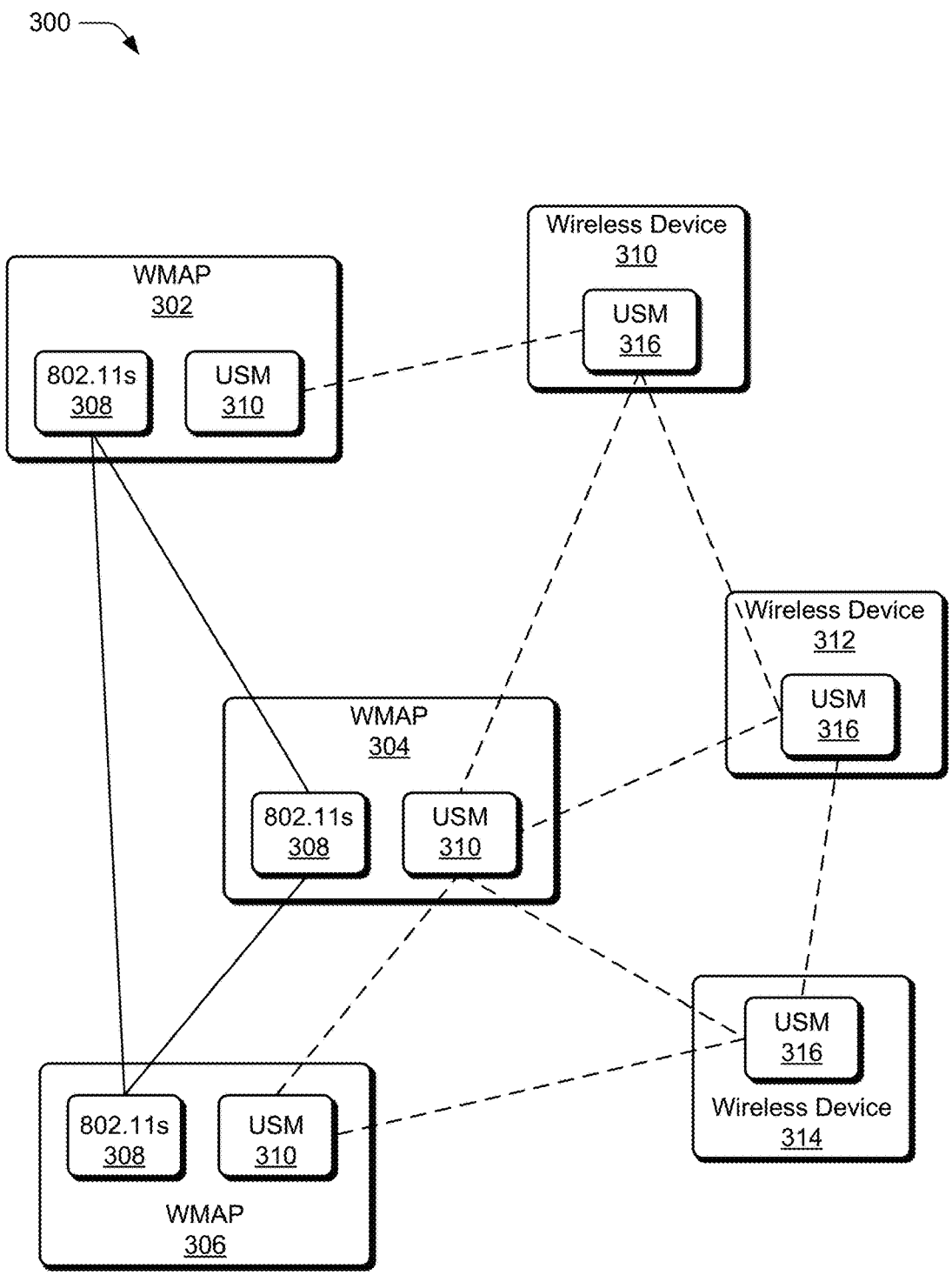
FIG. 3 illustrates an example hybrid wireless mesh network system in accordance with aspects of a wireless mesh access point with user-space tunneling.

FIG. 3 illustrates a hybrid mesh network that employs IEEE 802.11s mesh networking and techniques for user-space mesh networking using the techniques of wireless mesh access point with user-space tunneling. Wireless mesh networking is employed using the station mode interface and an application-layer tunnel network connection which can heterogeneously co-exist with other mesh nodes using 802.11s or other methods and a full mesh network can be formed by creating multiple tunnels to nearby neighboring access points.

Three WMAPs 302, 304, and 306 are connected using IEEE 802.11s mesh networking 308 at layer two, as illustrated by the solid lines in FIG. 3. The mesh network can be extended using wireless devices 310, 312, and 314. The wireless devices 310, 312, and 314 may include a chipset that supports wireless LAN, such as 802.11n, 802.11ac, or the like, but not 802.11s. Using user-space mesh networking 316, the mesh network 300 can be expanded, as illustrated by the dashed lines in FIG. 3, to include the wireless devices 310, 312, and 314, as well as the WMAPs 302, 304, and 306, to increase the coverage area and reliability of the mesh network, to allow a wider use of chip sets, and to avoid the need to modify kernel layer code. The WMAPs 302, 304, and 306 can concurrently communicate using IEEE 802.11s mesh networking 308 and user-space mesh networking 316. As such, the above implementation is not particularly dependent on a chip set manufacturer, and/or the associated driver, firmware, or wireless stack provided by such suppliers. The WMAPs are capable of concurrent station mode interface use and softAP operation which is supported by nearly all modern Wi-Fi chip sets.

Example Methods

Example methods 400 and 500 are described with reference to FIGS. 4 and 5 in accordance with one or more aspects of a wireless mesh access point with user-space tunneling. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
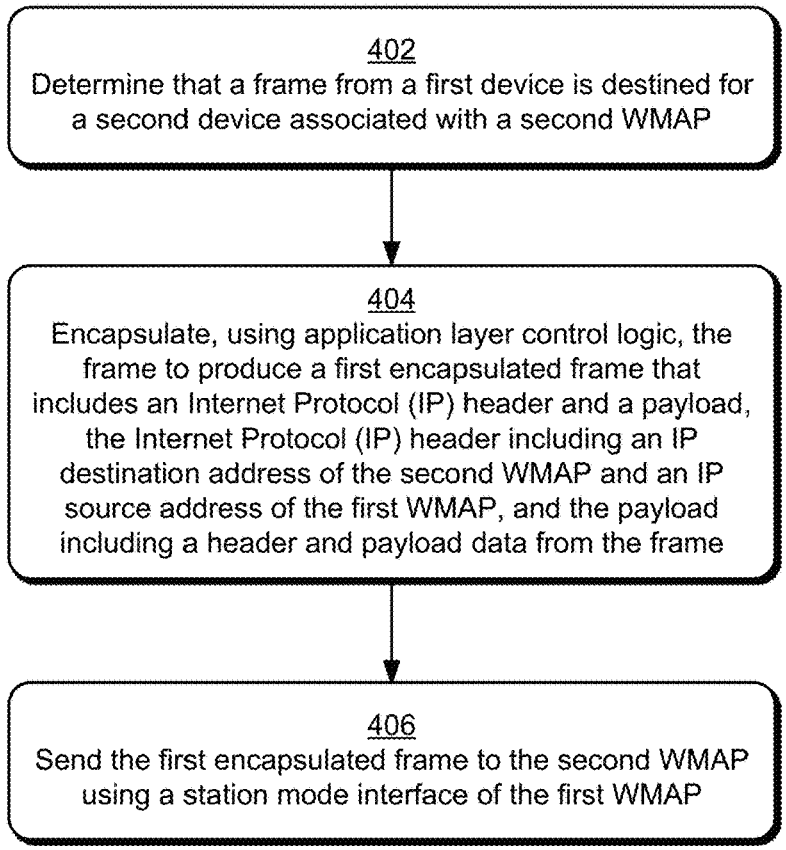
FIG. 4 an example method of a wireless mesh access point with user-space tunneling as generally related to a wireless mesh access point acting as a source node for user-space mesh networking in accordance with aspects of the techniques described herein.

FIG. 4 illustrates example method(s) 400 of a wireless mesh access point with user-space tunneling as generally related to a WMAP acting as a source node for user-space mesh networking. At block 402, a source WMAP (e.g., WMAP 102) determines that a frame (e.g., frame 200) from first device (e.g., wireless device 106) is destined for a second device (e.g., wireless device 110) associated with a second, destination WMAP (e.g., WMAP 104). For example, the bridge 130 uses a bridge table to track which frames go to which interfaces in the source WMAP.

At block 404, the source WMAP encapsulates, using the application layer control logic (e.g., application layer control logic 126) the frame to produce a first encapsulated frame (e.g., frame 212) that includes an Internet Protocol (IP) header and a payload, the Internet Protocol (IP) header including an IP destination address of the second WMAP and an IP source address of the first WMAP, and the payload including a header and payload data from the frame. For example, a layer three frame includes an IP destination address of the destination WMAP, an IP source address of the source WMAP, and a payload that includes the header and payload data from the frame (e.g., frame 200) that was provided by the first device.

At block 406, the source WMAP sends the encapsulated frame to the destination WMAP using a station mode interface (e.g., the station mode interface 122). For example, the application layer control logic 126 sends the frame 212 in a tunnel after it is further encapsulated by the station mode interface 122 with a layer two header. The station mode interface 122 treats the entire frame 214 as a payload and adds a layer two header thereby further encapsulating the frame 214 into an encapsulated frame 218 formatted as a station mode frame. Stated another way, the application layer control logic 126 is used to send the encapsulated frame 212 over the application layer tunnel 140 through the station mode interface 122 to the destination WMAP using the station mode interface that adds the layer two header to make the frame a source WMAP generated station mode interface frame.

Figure 5:
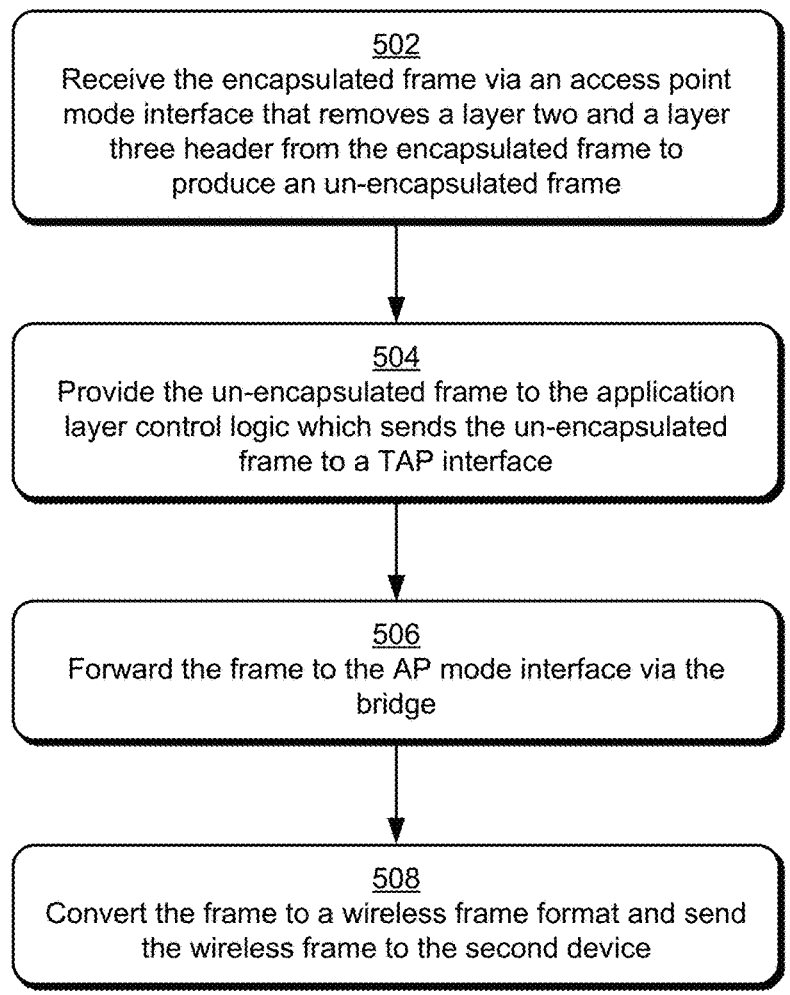
FIG. 5 an example method of a wireless mesh access point with user-space tunneling as generally related to a wireless mesh access point acting as a destination node for user-space mesh networking in accordance with aspects of the techniques described herein.

FIG. 5 illustrates example method(s) 500 of a wireless mesh access point with user-space tunneling as generally related to a WMAP acting as a destination node for user-space mesh networking. At block 502, a destination WMAP (e.g., WMAP 104) receives an encapsulated frame (e.g., the station mode interface encapsulated frame 218) via an access point mode interface (e.g., the access point mode interface 132) from a station mode interface (e.g., the station mode interface 122). For example, the access point mode interface 132 removes a layer two header from the encapsulated frame 218 and the kernel layer strips the layer three header via the network stack to produce a layer two unencapsulated frame 220 which is the same frame as frame 212.

At block 504, the AP mode interface in the destination WMAP provides the unencapsulated frame to an IP connection interface (e.g., IP connection interface 149) in the application layer control logic (e.g., the application layer control logic 136) which sends the unencapsulated frame via a TAP file (e.g., the TAP file 148) to a network TAP interface (e.g., the network TAP interface 134).

At block 506, the network TAP interface of the destination WMAP forwards the frame to the AP mode interface via a bridge, (e.g., the bridge 138). The TAP file of the application layer control logic 136 provides the frame for the bridge.

At block 508, the access point mode interface converts the frame to a wireless frame packet format, such that the access point mode interface 132 converts the frame to an 802.11 wireless frame (e.g., the frame 222) encapsulation, from an 802.3 Ethernet frame encapsulation and sends the converted frame to a destination wireless device (e.g., the wireless device 110).

Example Device

Figure 6:
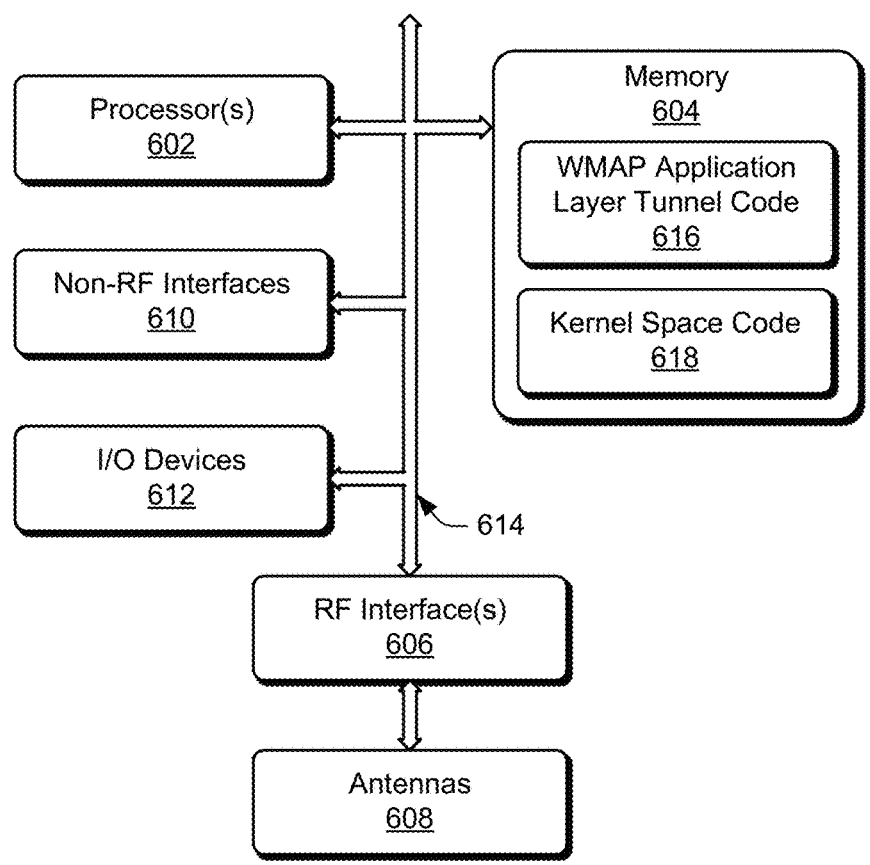
FIG. 6 illustrates an example device diagram that can implement various aspects of a wireless mesh access point with user-space tunneling.

Referring to FIG. 6, a block diagram of a WMAP is shown. A WMAP includes one or more processors 602 and memory 604. The memory can be any suitable volatile or non-volatile memory including ROM, RAM, DRAM, SRAM, or any other suitable memory. The processor 602 may include one or more central processing units that include one or more cores or any other suitable processors including digital signal processors or any other suitable logic. The WMAP also includes radio frequency interfaces 606 to allow the WMAP to communicate with wireless devices and other WMAPs via antennas 608. Non-radio frequency interfaces 610 such as local area network interfaces are also utilized if desired. The WMAP also includes in this example, input/output devices shown at 612 which include keyboards, touchscreens, audio input systems or any other input/output devices as desired. The various components are interconnected through suitable communication links shown generally at 614.

The memory 604 in one example, includes instructions that when executed by the processor(s)s 602, causes the processor(s) 602 to operate as the various interfaces and application layer control logic described above. As such, in this example, WMAP application layer tunnel code 616 includes instructions that the processor(s) 602 execute to operate as the application layer control logic 126. Also stored in the memory 604 is kernel space code 618 which includes instructions that the processor(s) 602 execute to operate as the various processes in the kernel layer including, for example, the bridge 130, the AP mode interface 120, the network TAP interface 124, and the station mode interface 122. A similar structure may be employed for the destination WMAP and it will be recognized that a WMAP may serve as either a source WMAP, a destination WMAP, or both.

Although aspects of a wireless mesh access point with user-space tunneling have been described in language specific to features and/or methods, the subject of the appended claims is not necessarily limited to the specific features or methods described. Rather, the specific features and methods are disclosed as example implementations of a wireless mesh access point with user-space tunneling, and other equivalent features and methods are intended to be within the scope of the appended claims. Further, various different aspects are described, and it is to be appreciated that each described aspect can be implemented independently or in connection with one or more other described aspects.

What is claimed is:

1. A method for forwarding a frame by a first wireless mesh network access point (WMAP) comprising:
   determining, in a kernel-space by the first WMAP, that the frame from a first device is destined for a second device that is associated with a second WMAP;
   encapsulating, using application layer control logic in a user-space, the frame to produce a first encapsulated frame that includes an Internet Protocol (IP) header and a payload, the Internet Protocol (IP) header including an IP destination address of the second WMAP and an IP source address of the first WMAP, and the payload including a header and payload data from the frame; and
   sending the first encapsulated frame to the second WMAP using a station mode interface of the first WMAP, the sending being effective to cause the second WMAP to forward the frame to the second device.

2. The method of claim 1, wherein encapsulating the frame to produce the first encapsulated frame comprises:
   receiving the frame from a virtual tunnel interface; and
   using a user-space file handle of the virtual tunnel interface to encapsulate the frame as a layer three frame.

3. The method of claim 1, wherein encapsulating the frame to produce the first encapsulated frame comprises:
   producing the first encapsulated frame to include as payload:
   a header comprising a media access control (MAC) address associated with each of the first and second devices, and
   an IP header that includes a destination IP address of the second device, a source IP address of the first device, and the payload data of the frame.

4. The method of claim 1, wherein sending the first encapsulated frame comprises:
   further encapsulating the first encapsulated frame by using the station mode interface to add a layer two header to the first encapsulated frame to produce a second encapsulated frame, the second encapsulated frame including a header comprising a receiver address (RA) that includes a media access control (MAC) address of a destination AP mode interface of the second WMAP, a source address (SA) that includes a MAC address of the source station mode interface of the first WMAP, and a destination address (DA) that includes a MAC address of the destination AP mode interface of the second WMAP.

5. The method of claim 1, comprising:
   receiving, by the first WMAP, the frame from the first device using an Access Point (AP) mode interface.

6. The method of claim 1, wherein sending the first encapsulated frame to the second WMAP uses an IEEE 802.11 standard other than the IEEE 802.11s standard.

7. A source wireless mesh access point (WMAP) comprising:
   an access point (AP) mode interface;
   a station (STA) mode interface; and
   the source WMAP configured to:
      determine, in a kernel-space, that a frame, received via the AP mode interface, from a source device is destined for a destination device associated with a destination WMAP;
      encapsulate, using application layer control logic in a user-space, the frame to produce an encapsulated frame that includes an Internet Protocol (IP) header and a payload, the Internet Protocol (IP) header including an IP destination address of the destination WMAP and an IP source address of the source WMAP, and the payload including a header and payload data from the frame; and
      send the encapsulated frame to the destination WMAP, using the station mode interface, which is effective to cause the destination WMAP to forward the frame to the destination device.

8. The source WMAP of claim 7, comprising:
   a layer two virtual network interface; and
   a bridge coupled to the AP mode interface and the layer two virtual network interface, the bridge configured to:
      receive the frame from the AP mode interface;
      determine that the frame is destined for the destination device associated with the destination WMAP; and
      based on the determination, forward the frame to the layer two virtual network interface.

9. The source WMAP of claim 8, wherein the application layer control logic is configured to:
   receive the frame from the layer two virtual network interface; and
   use a user-space file handle of a virtual tunnel interface to encapsulate the frame as a layer three frame.

10. The source WMAP of claim 7, wherein the application layer control logic is configured to:
    produce the encapsulated frame with an Internet Protocol (IP) header; and
    produce the encapsulated frame to include as payload:
    a header comprising a media access control (MAC) address associated with each of the source device and the destination device, and
    an IP header that includes a destination IP address of the destination device, a source IP address of the source device and the payload data of the frame.

11. The source WMAP of claim 10, wherein the station mode interface is configured to:
    further encapsulate the encapsulated frame by adding a layer two header to the encapsulated frame, the further encapsulated frame including a header comprising a receiver address (RA) that includes a media access control (MAC) address of the destination AP mode interface of the destination WMAP, a source address (SA) that includes a MAC address of the source station mode interface of the source WMAP, and a destination address (DA) that includes a MAC address of the destination AP mode interface of the destination WMAP.

12. The source WMAP of claim 7, comprising:
    one or more processors; and
    memory comprising instructions executable by the one or more processors to cause the one or more processors to perform operations of the AP mode interface, the virtual tunnel interface, and the STA mode interface as kernel-space operations, and to perform the application layer control logic operations at an application layer in a user-space.

13. The source WMAP of claim 7, wherein the access point (AP) mode interface is an IEEE 802.11 AP mode interface, and wherein the station (STA) mode interface is an IEEE 802.11 STA mode interface.

14. The source WMAP of claim 13, wherein the IEEE 802.11 AP mode interface and the IEEE 802.11 STA mode interface implement a version of the IEEE 802.11 standard other than the IEEE 802.11s standard.

15. The source WMAP of claim 13, comprising an IEEE 802.11s chipset, and wherein the source WMAP is configured to concurrently communicate via a second Wi-Fi mesh network using the IEEE 802.11s standard.

16. A destination wireless mesh access point (WMAP) comprising:
- an access point (AP) mode interface comprising a TAP file and an Internet Protocol (IP) connection interface;
- application layer control logic; and
- a virtual tunnel interface;
- the AP mode interface configured to:
  - receive an encapsulated frame from a source WMAP;
  - remove a layer two and a layer three header from the encapsulated frame to produce an un-encapsulated frame; and
  - provide the un-encapsulated frame to the application layer control logic;
- the application layer control logic configured to:
  - receive, using the IP connection interface, the un-encapsulated frame from a virtual network interface;
  - write the un-encapsulated frame to the TAP file causing the TAP file to send the un-encapsulated frame to the virtual network interface;
- the virtual tunnel interface configured to:
  - forward the un-encapsulated frame to the AP mode interface; and
- the AP mode interface configured to:
  - receive the un-encapsulated frame from the virtual network interface; and
  - write the un-encapsulated frame to the TAP file
  - convert the un-encapsulated frame to a wireless frame in wireless frame format; and
  - send the wireless frame to a destination device.

17. The destination WMAP of claim 16, further comprising a bridge coupled between the AP mode interface and the virtual tunnel interface, the bridge configured to:
- receive the un-encapsulated frame from the virtual network interface;
- determine that the un-encapsulated frame is destined for the destination device that is associated with the destination WMAP via the AP mode interface; and
- based on the determination, forward the un-encapsulated frame to the AP mode interface.

18. The destination WMAP of claim 16, wherein the AP mode interface is an IEEE 802.11 AP mode interface, and wherein the IEEE 802.11 AP mode interface implements a version of the IEEE 802.11 standard other than the IEEE 802.11s standard.

19. The destination WMAP of claim 16, comprising an IEEE 802.11s chipset, and wherein the destination WMAP is configured to concurrently communicate via a second Wi-Fi mesh network using the IEEE 802.11s standard.

20. The destination WMAP of claim 16, comprising:
- one or more processors; and
- memory comprising instructions executable by the one or more processors to cause the one or more processors to perform operations of the AP mode interface and the virtual tunnel interface as kernel-space operations, and to perform the application layer control logic operations at an application layer in a user-space.

* * * * *